Patented Feb. 24, 1948

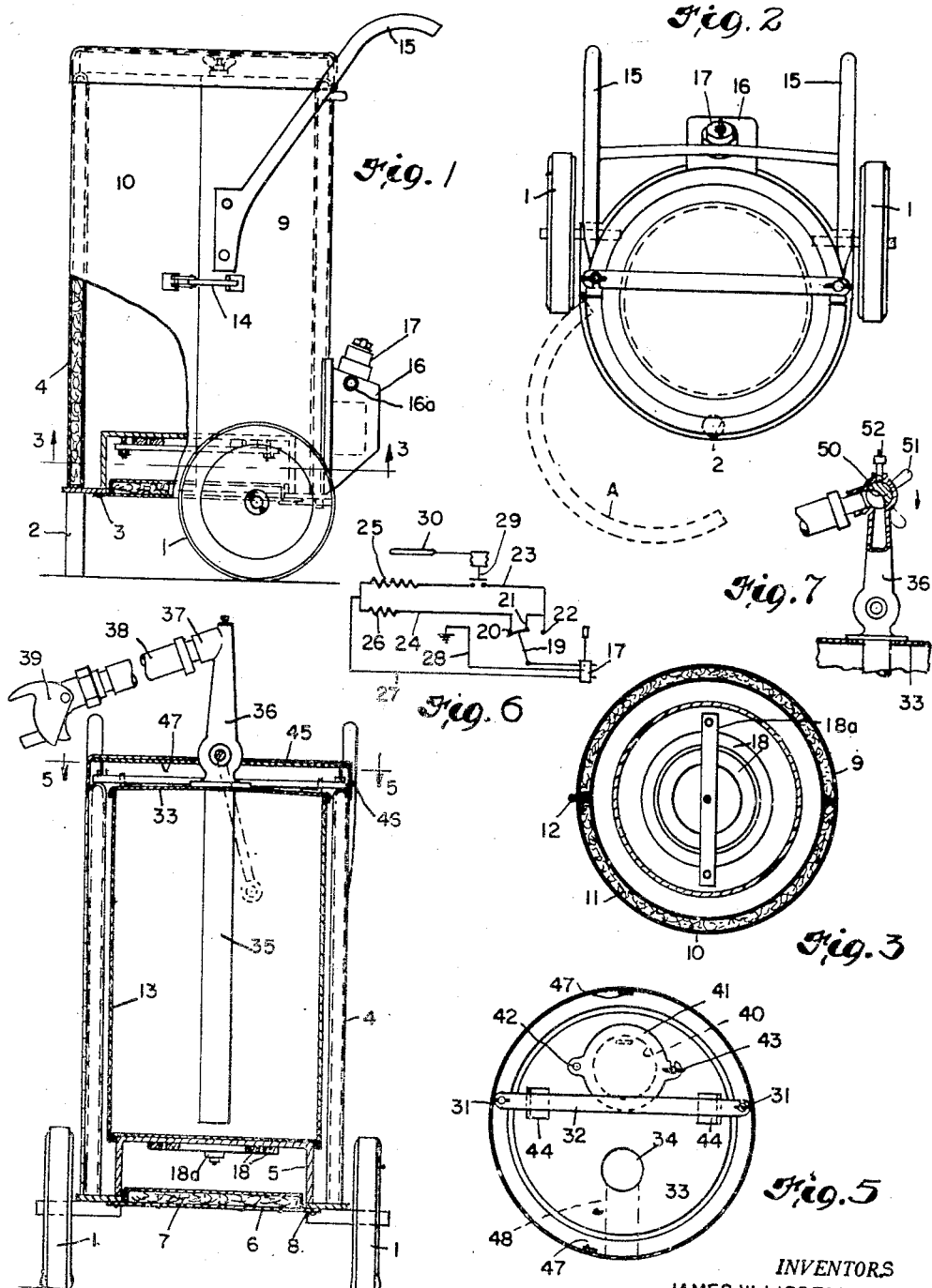

2,436,722

UNITED STATES PATENT OFFICE 2,436,722

GREASE DISPENSING APPARATUS

James W. Liddell, Evanstown, and Edward F. Shannon, Chicago, Ill., assignors to Continental Oil Company, Ponca City, Okla., a corporation of Delaware Application October 19, 1945, Serial No. 623,322

4 Claims. (Cl. 222—146)

This invention relates to a device which is particularly applicable for use in dispensing viscous materials such as heavy oils or greases and which at room temperature, or temperatures lower than room temperatures usually encountered where products of this kind are employed, will not flow to the extent where they may be poured or pumped.

A notable example of a material which may be handled by the apparatus of this invention is the heavy oil or grease used in lubricating various parts of railroad trains. Equipment of this kind requires a very stiff lubricant so that even in warm weather the lubricant does not flow readily, if at all. The difficulties in handling the lubricant are aggravated in cold weather when the lubricant progressively stiffens and at low temperatures finally becomes a solid mass. It is common practice for the workmen servicing equipment of this character to form by hand balls of the lubricant which are dropped into the gear cases where the lubricant is required. This is a wasteful, time-consuming operation which is unpleasant to perform and does not apply the lubricant to the equipment in the form in which it should be applied.

It is a principal object of this invention to provide an apparatus which is capable of handling the stiffest lubricants in cold weather and applying them to the gear cases or the like in fluid form so that not only is the work of applying the lubricant greatly facilitated, but the unpleasant and wasteful practices of the prior art as above pointed out are avoided. Other objects of the invention will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

In said annexed drawing—

Fig. 1 is a side elevation, partially in section, of an apparatus constructed in accordance with this invention;

Fig. 2 is a plan view of the apparatus illustrated in Fig. 1;

Fig. 3 is a section view of the structure illustrated in Fig. 1 taken in a plane substantially indicated by the line 3—3;

Fig. 4 is a vertical section through the structure of Fig. 1;

Fig. 5 is a sectional view of the structure illustrated in Fig. 4 taken on a plane substantially indicated by the line 5—5;

Fig. 6 is a schematic diagram showing the electrical circuit for the apparatus of the previous figures; and Fig. 7 is a fragmentary part section part side elevation of a portion of the apparatus illustrated in the previous figures showing an alternative form of construction.

Referring now more specifically to Figs. 1, 2 and 4, the device with which this invention is concerned comprises a wheeled cart having spaced wheels 1 and a standard 2 supporting a base, generally indicated at 3, on which is mounted a casing, generally indicated at 4.

The base 3 is substantially circular with a raised central portion generally indicated at 5 likewise circular in cross section. The recess provided by the projection 5 is closed by means of a removable cover generally indicated at 6 and which comprises a central thermally insulated body portion 7 provided with a marginal flange 8 by which the cover may be attached to the lower face of the base by means such as screws or the like.

Mounted on the base 3 is the casing 4 which, as most clearly illustrated in Fig. 3, comprises two substantially semi-circular sections 9 and 10, each of double-walled construction with the space between such walls filled with a thermal insulation 11.

Along one of the mating edges of the complementary sections 9 and 10 there is a hinge 12 which may be of any suitable form, but which is shown to be of the same construction as the conventional so-called "piano hinge."

The section 9 of the casing 4 is secured to the base 3 at the lower edge of such section by any suitable means, such as welding. The section 10 is not secured to the base 3 but is supported entirely by the hinge 12 on the section 9. Thus section 10 may be swung outwardly about the axis of the hinge 12 in the manner indicated by the dotted-line position A in Fig. 2, so that there may be placed in the casing a drum or similar container 13, such container being the container in which the manufacturer of the lubricant has packaged and shipped the same. After the lubricant container is thus placed in the cart in the position illustrated in Fig. 4, the section 10 may be swung shut and held in closed position by means of a hame-tight latch generally indicated at 14. Secured to the fixed section 9, as by riveting or the like, are spaced handles 15 which project laterally from the casing and are cross-braced by means of a bar 15 so that the cart may be manipulated and moved from place to place by means of such handles.

At the lower end of the fixed casing section 9 is an enlargement, generally indicated at 16, on the upper face of which is mounted an electric switch 17 of conventional design. The projection 16 also houses a thermostat element of conventional design, as diagrammatically illustrated in the wire circuit of Fig. 6, and leading from the interior of such projection 16 are electrical leads which extend to a resistance heating element 18, the location of which is most clearly illustrated in Fig. 4 and which may likewise be of conventional design. The heating element 18 is clamped in position on the lower face of the base projection 5 by means of a cross bar 18a.

In Fig. 6 there is illustrated diagrammatically a wiring diagram which includes the switch 17 having a contactor 19 adapted to make contact with the points 20, 21 and 22. From these last-named points extend leads 23 and 24 which extend to resistance units 25 and 26, the latter being connected by means of lead 27 back to the switch 17 and from which there also extends a ground lead 28 which may be connected to the frame of the cart at any suitable point. The switch 17 is so constructed that the contactor 19 may have contact with only point 21; only point 22; or both points 20 and 21. When the contactor is in contact with only point 20, then only the lesser of the two resistance units, i. e., 26, will be in the heating circuit. When the contactor is in contact with points 21 and 22 or only 22, then the greater resistance unit, i. e., 25, will be in the circuit. When, however, the contactor 19 makes contact with both points 20 and 21, then both resistance units will be in the circuit in parallel. It will thus be seen by means of the switching arrangement illustrated, it is contemplated that a three-stage heating unit be employed for the purpose hereinafter more fully explained.

In series in the lead 23 there is a bellows-controlled switch 29 actuated by means of a thermostat 30 of conventional design. The thermostat may be placed at any point in the casing 4 or it may be placed in the throat of the recess in the projection 16. The projection 16 may be provided with a recess 16a for the reception of an electrical jack by which a circuit may be established to the switch 17 from an outside pair of leads. Alternatively, a cable containing the necessary leads may be attached to the switch 17 and carried by the cart with the connecting jack at the end of such cable.

The vertical height of the casing 4 is such that its upper edge will be substantially flush with the upper edge of a standard size grease container such as 13. The upper edge of the casing, or more particulary the fixed section 9 thereof, is provided with threaded studs 31 extending upwardly therefrom and which are adapted to receive a spanner bar 32, such bar being secured in place by means of wing nuts on the studs 31.

There is provided for use with the container 13, as furnished by the lubricant manufacturer, a cover generally indicated at 33, which comprises a circular disc having a dependent marginal flange of an inside diameter slightly greater than the outside diameter of the standard container 13. The cover 33 is provided with an opening 34 through which may be projected the tube 35 of a conventional grease pump, generally indicated at 36. The discharge conduit 37 of the pump 36 is provided with a flexible conduit 38, to the end of which there is secured a valve 39. It will be found that the use of a conventional molasses gate will be preferable for the valve 39. The cover 33 is also provided with an inspection opening 40, normally closed by means of a substantially circular plate 41 pivotally secured as at 42 to the cover 33 and held in closed position by means of a threaded stud 43 projecting upwardly from the cover 33 and on which there is threaded a wing nut. The cover 33 is provided with angle-shape brackets 44 secured thereto as by welding or the like and so arranged that the upstanding legs thereof will be engaged by the cross bar 32 when the latter is used to clamp the lead 33 onto the container 13.

In order to prevent undue dissipation of heat from the interior of the casing 4, there may be provided a cover 45. The cover 45 is a substantially circular plate of suitable material such as sheet steel and provided with a marginal flange 46 adapted to extend downwardly over the outside of the casing 4. The inner or lower face of the cover 45 is provided with an adherent layer of thermal insulation 47. The cover 45 when in position will normally rest on the upper ends of the threaded studs 31. In order to further support and balance the cover in this position, there may be provided lugs such as 47 at spaced points on the inner periphery of the flange 46 and which lugs are adapted to rest on the upper edge of the casing 4 and provide third and fourth points of support for the cover 45. The cover 45 is provided with a slot generally indicated by the lines 48 in Fig. 5, which slot extends inwardly sufficiently so as to accommodate the pump 36 as the cover 45 is moved laterally into position over the casing 4.

It will be observed that by the expedients illustrated and described there is provided a means whereby a container such as 13 of a solid, plastic or semi-fluid material, such as a lubricant, may be heated and by being contained in an insulated shell, maintained heated, to such an extent and for such a period of time that the contents of the container 13 may be preserved in a pumpable state. The cart may therefore be first heated, and then the source of heating current disconnected and the cart wheeled about to the various places where the lubricant is required, during which entire time the lubricant is maintained sufficiently fluid by virtue of being heated so that it may be readily pumped to the point of desired application. Alternatively, electrical connection, if by means of a cord long enough, may be maintained continuously during the use of the apparatus.

In Fig. 7 there is illustrated a modified form of the pump which in this instance is provided with a valve generally indicated at 50 which may be manipulated by a handle generally indicated at 51. The casing surrounding the valve plug 50 is provided with a fitting 52 which is a conventional air hose fitting. The plug 50 of the valve may occupy either the position illustrated in full lines in Fig. 7 or, when the handle 51 is rotated in a clockwise direction to the position illustrated in dotted lines, the plug 50 will be correspondingly rotated to seal off the passage extending upwardly through the pump but providing communication between the air hose fitting 52 and the interior of the delivery hose 38.

When the pump is in use, the valve 50 will be in the full line position illustrated in Fig. 7. When the use of the apparatus is to be discontinued for any length of time, and the apparatus stored in a space where the temperature would cause the lubricant to congeal or solidify in the hose 38, the valve 50 is rotated to the dotted line position illustrated in Fig. 7, the delivery end of the hose is inserted through the opening 33, and then an air hose connected to the fitting 52 and compressed air admitted into the hose 38. This will blow all of the lubricant in the hose 38 into the tank 13 leaving the hose empty. The apparatus may then be stored and when it is to be used again the heated contents of the tank 13 may be pumped through the delivery hose 38 to the point of use.

Other modes of applying the principle of the invention may be employed, change being made as regards the detail described, provided the features stated in any of the following claims, or the equivalent of such, be employed.

We therefore particularly point out and distinctly claim as our invention:

1. A portable dispensing device for tacky, viscous lubricants which in a normal state are non-pumpable comprising a wheeled base, heating means on said base including an electrical resistance unit and a controlled circuit comprising a manually operable selector switch and a thermostatic switch, a thermally insulated casing on said base and adapted to receive a container for said viscous lubricants, a removable insulated cover for said casing, and manipulating handles secured to said assembly and extending laterally therefrom, whereby the viscous lubricant is maintained in a constant pumpable state by the heat generated by the heating unit in the wheeled base, said heat being retained by the insulating case.

2. A portable dispensing device for tacky, viscous lubricants which in a normal state are non-pumpable comprising a wheeled base, heating means on said base including an electrical resistance unit and a controlled circuit comprising a manually operable selector switch and a thermostatic switch, a thermally insulated casing adapted to receive the container for the lubricant on said base, said casing comprising separable complementary first and second sections mating on a substantially vertical plane with said first section fixed securely to said base and said second section hinged to first section and a clamp for securing said sections in assembled relation, and manipulating handles secured to said assembly and extended laterally therefrom.

3. A portable dispensing device for tacky, viscous lubricants which in a normal state are non-pumpable comprising a wheeled base, heating means on said base including an electrical resistance unit and a controlled circuit comprising a manually operable selector switch and a thermostatic switch, a thermally insulating casing adapted to receive the container for the lubricant on said base, said casing comprising separably complementary first and second sections mating on a substantially vertical plane with said first section fixedly secured to said base and said second section hingedly secured to said first section, a clamp for securing said sections in assembled relation, manipulating handles secured to said assembly and extending laterally therefrom and a removable insulating cover for said casing, said cover provided with an opening extending from an intermediate point to the margin thereof.

4. A portable dispensing device for thermoplastic materials which in a normal state are non-pumpable comprising a portable thermally insulated cabinet adapted to receive a container for said material, heating means in said cabinet, manually operated pump provided with a delivery conduit for dispensing said material, and means associated with said pump and conduit whereby after the dispenser has been in use the contents remaining in said conduit may be forced back into said container leaving said conduit empty when not in use.

JAMES W. LIDDELL.
EDWARD F. SHANNON.

REFERENCES CITED

The following references are of record in the file of this patent:

UNITED STATES PATENTS

| Number | Name | Date |
|---|---|---|
| 1,929,231 | Yirava | Oct. 3, 1933 |
| 1,933,403 | Wilson | Oct. 31, 1933 |
| 1,940,271 | Renfrew | Dec. 19, 1933 |
| 1,955,199 | Menge | Apr. 7, 1934 |
| 2,167,682 | Samiran | Aug. 1, 1939 |